(No Model.)

J. W. BONTA.
APPARATUS FOR THE MANUFACTURE OF ORNAMENTAL SHEETS OR PLATES OF GLASS.

No. 529,157.  Patented Nov. 13, 1894.

Witnesses:
Harry G. Davis
Jas. L. Skidmore

Inventor
James W. Bonta
by his Attorney,
Jno E Parker

UNITED STATES PATENT OFFICE.

JAMES W. BONTA, OF WAYNE, PENNSYLVANIA, ASSIGNOR TO THE BONTA PLATE GLASS COMPANY, OF WEST VIRGINIA.

APPARATUS FOR THE MANUFACTURE OF ORNAMENTAL SHEETS OR PLATES OF GLASS.

SPECIFICATION forming part of Letters Patent No. 529,157, dated November 13, 1894.

Application filed February 2, 1894. Serial No. 498,903. (No model.)

*To all whom it may concern:*

Be it known that I, JAMES W. BONTA, a citizen of the United States, residing at Wayne, in the county of Delaware and State of Pennsylvania, have invented certain new and useful Improvements in Apparatus for the Manufacture of Ornamental Sheets or Plates of Glass; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in machinery for the manufacture of sheets of glass, and is more especially adapted for the production of sheets provided on one side with an embossed or ornamental surface, the object of the invention being to construct machines of this character which will accomplish its work in an effective and rapid manner, the speed of the operation being such that sheets of the largest size may be operated upon before any portion of the glass has time to cool or set to such an extent as will prevent its being successfully operated upon by the engraved or embossed rolling surface.

Figure 1:
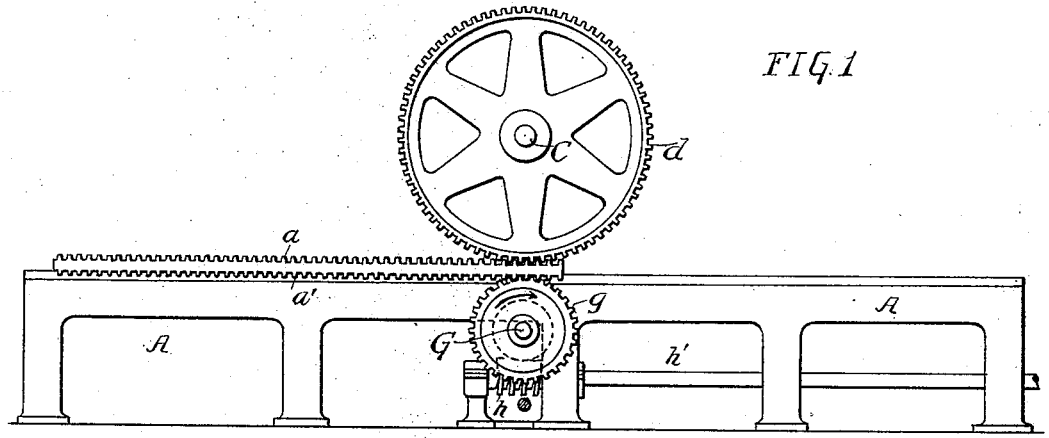
Figure 2:
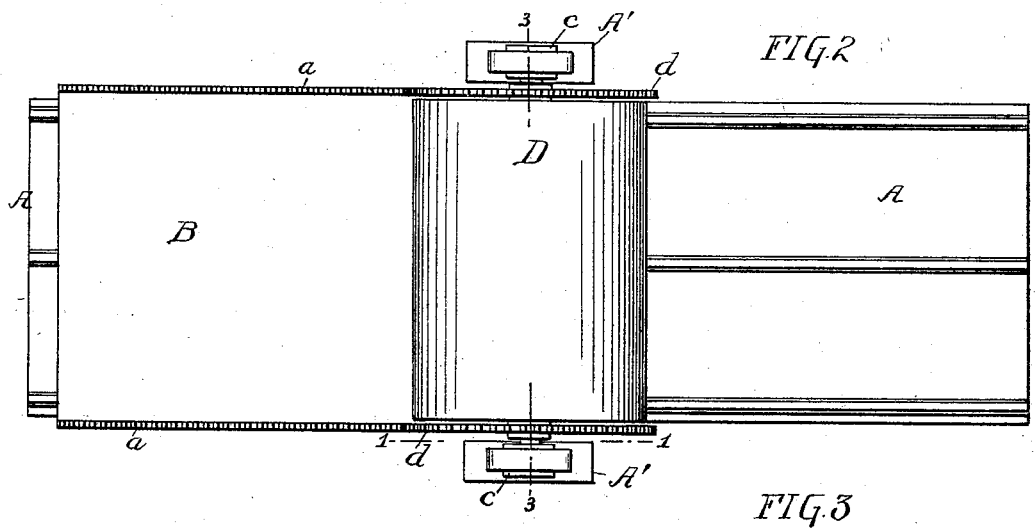
Figure 3:
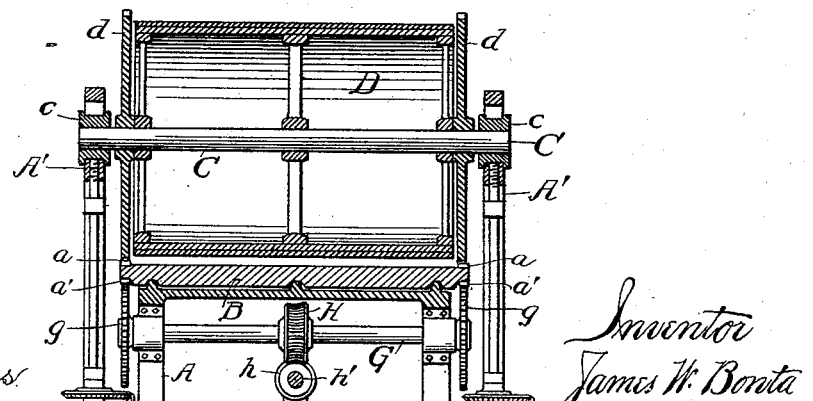

In the accompanying drawings:—Figure 1, is a sectional elevation on the line 1—1, Fig. 2, of a glass rolling machine constructed in accordance with my invention. Fig. 2, is a plan view of the same; and Fig. 3, is a cross section on the line 3—3, Fig. 2.

The various working parts of the machine are supported upon a suitable frame work A, and horizontally guided in the upper portion of the frame work is a table or, platen B, on which is placed the molten glass to be operated upon. The opposite edges of this table extend preferably a slight distance beyond the sides of the frame, and extending along each edge is a double rack $a$, $a'$, the teeth of the upper racks $a$ being somewhat elongated to permit of the vertical adjustment of the gear wheels with which they intermesh.

On the opposite sides of the central portion of the frame are standards A', in the upper portions of which are vertically adjustable journal boxes $c$ serving to support the shaft or journals C of a roller D, the diameter of which is much greater than that of the rolls ordinarily employed in glass rolling machines, so that its circumferential surface will be about equal to or greater than the surface area of the table B on which the glass to be operated upon is placed. At the opposite ends of the roller are gear wheels $d$, having elongated teeth which intermesh with the teeth of the racks $a$, so that the teeth will still be in working contact with the teeth of the rack when the roll is adjusted to a greater or less distance from the table in the manufacture of sheets of glass of varying thickness.

The circumference of the roll D is provided with an engraved or embossed surface, and the design which it carries is reproduced in the sheet of glass as the latter is carried out by the table B under the roll.

The designs which it is desired to reproduce are first made in relief in plaster of paris or similar substance, and from this is made a mold in material which may be curved to the line of the roll, and the pattern plates are then preferably cast in sections and removably secured to the peripheral roll in such manner that they may be readily renewed or replaced by plates carrying other designs.

Extending transversely across the frame, immediately under the table, is a shaft G carrying on its opposite end gear wheels $g$ which intermesh with the lower racks $a'$ on the edges of the table, and at about the center of such shaft is secured a worm gear H intermeshing with a worm $h$ on a power driven shaft $h'$, the latter being provided with suitable clutches or reversing mechanism for effecting the rotation of the shaft alternately in opposite directions.

In operation, the various parts being in the position shown in Fig. 1, with the end of the table slightly beyond the engraved or ornamental surface of the roll, the molten glass is poured upon the table and motion is imparted to the shaft $h'$ to effect the rotation of the gear wheels $g$ in the direction of the arrow Fig. 1, and the consequent movement of the table and the roll D, which, moving together at the same surface speed, roll the glass out into the form of a sheet, while its upper surface is subjected to the action of the roll, and the design carried by the latter is reproduced perfectly in the glass. When the table reaches the opposite side of the roll the movement of the shaft $h'$ is stopped and the sheet of manufactured glass is pushed off into an annealing oven. The direction of rotation of the shaft $h'$ is then reversed and the various parts reassume their initial position in readiness to receive a fresh supply of glass.

The advantages to be gained from the use of a roll of large diameter, having on its surface an engraved design, will be readily apparent. Where a roll of small diameter is employed, the indentations or depressions which may form a part of the design to be reproduced, will not so readily receive the glass, and where these depressions may be followed by equally large projecting portions, it will be almost impossible for the glass to fully enter them, especially where the edges of the indentation are sharp, or where its sides are at a comparatively sharp angle to the surface of the roll, for the reason that in leaving the raised portion of the glass which has entered such depressed portions of the molded glass, the arc through which such engraved surface must raise in leaving the glass, is so small that it will in many cases damage or impair the design to such an extent that the sheets must be destroyed.

In the use of a large roll such as that which I propose to employ, the arc through which the engraved portions may raise is materially increased, or in place of a roller a simple segment of a roller may be employed.

Having thus described my invention, what I claim, and desire to secure by Letters Patent, is—

1. A glass rolling machine comprising in combination, a frame, a horizontally movable table guided thereon, upper and lower racks provided on the opposite edges of said table, a roll, gear wheels on the opposite ends of said roll adapted to intermesh with the upper table racks, a lower shaft extending transversely across the machine, gear wheels mounted on said shaft and intermeshing with the lower table racks, and mechanism for rotating said shaft alternately in opposite directions, substantially as specified.

2. A glass rolling machine comprising in combination a frame, a horizontally movable table mounted thereon, upper and lower racks provided on the opposite edges of said table, a roll mounted above the table, vertically adjustable journal boxes in which said roll is carried, gear wheels on the opposite ends of said roll adapted to intermesh with the upper table racks, a lower shaft extending transversely across the machine, gear wheels mounted on said shaft and intermeshing with the lower table racks, and mechanism for rotating said shaft alternately in opposite directions, substantially as specified.

3. A glass rolling machine comprising in combination a frame, a horizontally movable table guided thereon, rack teeth forming upper and lower racks on the opposite edges of each table, a glass pressing roller mounted in journals above the table, said roller having a surface area equal to or greater than that of the table, and provided on said surface with an engraved or cast design to be reproduced on the glass, gear wheels on the opposite ends of said roll adapted to intermesh with the upper table racks, a lower shaft extending transversely across the machine, gear wheels mounted on said shaft and intermeshing with the lower table racks, and mechanism for rotating said shaft alternately in opposite directions, substantially as specified.

4. The combination in a glass rolling machine, of the frame A, the table B, racks $a, a'$, provided on each edge of said table, a glass pressing roller D adjustably mounted above said table, gear wheels $d$ on opposite ends of said roll and intermeshing with the racks $a$, a shaft G extending transversely across the frame under said table, gear wheels $g$ mounted on said shaft, and intermeshing with the racks $a'$, a worm gear H secured to said shaft, a worm $h$ intermeshing with said worm gear, a power driven shaft $h'$ on which said worm is secured, substantially as specified.

In testimony whereof I affix my signature in presence of two witnesses.

JAMES W. BONTA.

Witnesses:
JNO. E. PARKER,
H. S. DONALDSON.